United States Patent [19]
Thompson

[11] Patent Number: 5,176,018
[45] Date of Patent: Jan. 5, 1993

[54] SHOT SENSING SHOT PEENING SYSTEM AND METHOD HAVING A CAPACITANCE BASED DENSITOMETER

[75] Inventor: Robert A. Thompson, New York, N.Y.

[73] Assignee: General Electric Company, Schenectady, N.Y.

[21] Appl. No.: 770,007

[22] Filed: Oct. 2, 1991

[51] Int. Cl.⁵ .............................. B24C 1/10
[52] U.S. Cl. ............................ 72/53; 51/319; 51/439; 73/861.71
[58] Field of Search ............... 72/53; 29/90.7; 51/319, 51/320, 415, 438, 439; 73/861.73, 801.72, 11

[56] References Cited

U.S. PATENT DOCUMENTS 4,614,100 9/1986 Green et al. ..................... 72/53
4,848,123 7/1989 Thompson ....................... 72/53

Primary Examiner—David Jones
Attorney, Agent, or Firm—James R. McDaniel; Paul R. Webb, II

[57] ABSTRACT

The present invention relates to shot peening and more specifically, shot peening where the shot is sensed capacitance-based densitometer in order to determine the average velocity of the shot as it exits the nozzle of a shot peening gun.

11 Claims, 2 Drawing Sheets

SHOT SENSING SHOT PEENING SYSTEM AND METHOD HAVING A CAPACITANCE BASED DENSITOMETER

BACKGROUND OF THE INVENTION

1. Field of the Invention

The present invention relates to shot peening and, more specifically, shot peening wherein the shot is sensed by a capacitance based densitometer in order to determine a characteristic or quality of the shot peening process.

2. Description of Related Art

The use of shot peening is relatively well known. In particular, a stream of shot (i.e., particles) is directed at a surface at high velocity. The shot is directed at the surface on a workpiece so as to cause plastic deformation of the surface of the workpiece, often a metal surface. The shot peening is often used to increase fatigue strength, although the process may be applied for other purposes.

Various shot peening devices and techniques have been developed over the years. Shot peening systems, generally, have (or can be readily equipped with) mass flow controllers. Such controllers are used to control the flow of shot to the shot peening gun. One common type of mass flow controller for use with shot made from magnetic material has an electromagnet which is pulsed in order to allow passage of a metered amount of shot into a shot peening gun. This common type of mass flow controller uses internal electrical feedback to stabilize the mass flow rate (i.e., the amount of shot metered in a given time). A control may be used to set the mass flow rate to a desired value. A display is often used to indicated the flow rate.

As part of a mass flow controller, or as a separate component, prior shot peening systems have included various shot flow meters which provide an indication of the flow rate of the shot. The shot flow meter might be a magnetic densitometer, an example of which is the Model 260 Shot Flow Meter manufactured by Electronics Incorporated of Mishawaki, Ind., as disclosed in U.S. Pat. No. 4,873,855 to Thompson and assigned to the same assignee as the present invention.

The sensor of the magnetic densitometer, as in U.S. Pat. No. 4,8743,855, is a wire coil wound around a tube through which the shot travels. Basically, the device measures the amount of shot under the coil at a given time by sensing the inductance of the coil. In the length of time it takes a particle of shot to traverse the length of the coil, the shot in the coil is fully replaced by new shot.

Therefore, if
L = coil length (inches)
T = time for shot to pass through coil (sec.)
v = shot velocity (in.sec.)
m = amount of shot inside the coil (lbs.) and
dm/dt = R = shot mass flow rate,
the mass flow rate of shot through the coil is;

$$R = m/T (\text{lbs.sec.}) \quad (1)$$

and $$v = L/T (\text{in./sec.}) \quad (2)$$

such that $$R = mv/L (\text{lbs.sec.}) \quad (3)$$

In order to solve for the mass flow rate R, the coil of the magnetic densitometer of Model 260 is installed in the shot feed line vertically beneath the shot flow control valve. From ballistics, the average velocity v of the freely falling shot in the coil is a known constant.

Since the densitometer measures m and the values v and L are known constants, the signal processing section of the flow meter performs equation 3 and develops a signal representative of the mass flow rate R.

Although the mass flow rate is useful information, it is insufficient by itself to give an indication of the quality of the shot peening applied to a particular surface.

The intensity of the shot peening process depends on the extent to which the workpiece surface is upset by impact of the shot stream. This upset depends to a large extent on the kinetic energy of the shot impact in the area over which it is absorbed. The shot particle energy is one-half of the particle mass times the particle velocity squared. It is clear that the shot velocity is an important factor in surface upset.

Although some measurement techniques have been used in conjunction with the shot peening process, most such prior techniques have been inadequate to conveniently and inexpensively provide an indication of the quality of the shot peening technique. The general absence of simple and inexpensive techniques to measure the quality of shot peening inhibits one's confidence that consistent shot peening results can be obtained.

It is also known in shot peening systems to employ a capacitive proximity sensor to detect the passage of shot. Exemplary of such a device is U.S. Pat. No. 4,693,102. While U.S. Pat. No. 4,693,102 employs a capacitive sensor to detect nonmetallic materials, the sensor merely detects whether or not particles are flowing through the discharge. Therefore, a more advantageous system would be presented if the velocities of ferromagnetic and non-ferromagnetic materials could be determined while employing the advantageous capacitive sensor.

Capacitive-type correlation sensors have been employed to detect the velocities of pneumatically transported solids. Exemplary of such sensors in U.S. Pat. No. 4,604,904. U.S. Pat. No. 4,604,904 merely discloses a capacitance-type correlation sensor which perform several complex steps before the velocity of the transported solids can be determined. In particular, the sensor first measures and stores the instantaneous density of the solids upstream and a first waveform is produced. Next, the sensor measures and stores the instantaneous density of the solids downstream and a second waveform is produced. The two wavelengths are compared. If the wavelengths compare favorably within prescribed limits, the velocity is determined because the distance between the upstream and the downstream measurements are known along with the time between their recording. Clearly, this type of velocity sensor relies a great deal upon the sensitivity of the sensor and the comparison limits. It is apparent that this sensor involves quite complex correlative techniques. Consequently, further reductions in the complexity of the capacitive sensor would be advantageous as long as the sensor could still accurately measure the velocities of ferromagnetic and non-ferromagnetic particles.

It is apparent from the above that there exists a need in the art for a shot peen sensor which is capable of measuring the velocity of the shot peen, and which can measure the velocity of ferromagnetic and non-ferromagnetic particles, but which at the same time can determine the velocity without having to perform complex, time consuming and costly steps. It is a purpose of this invention to fulfill this and other needs in the art in a manner more apparent to the skilled artisan once given the following disclosure.

SUMMARY OF THE INVENTION

Generally speaking, this invention fulfills these needs by providing a shot peening system, comprising a gun for shot peening, said gun having a nozzle with an outlet, a first sensor adjacent said nozzle outlet, said first sensor including first and second rings such that a capacitance field is created between said first and second rings which varies according to the amount of shot passing through said nozzle outlet, a first sensing circuit means connected to said first and second rings for sensing a capacitance field between said rings and generating an amount signal representative of said amount of shot passing through said nozzle outlet, a second sensor responsive to the amount of shot supplied to said gun, a second sensing circuit means connected to said sensor for generating a time-dependent signal corresponding to the amount of shot supped to said gun during a unit period of time, and calculation means for receiving as inputs said amount signal and said time-dependent signal and generating therefrom a velocity signal representative of the average velocity of shot leaving said gun.

In certain preferred embodiments, the first sensor is a capacitance based densitometer. Also, the first sensor can be either separately attached to the nozzle of the shot peening gun or built directly into the gun nozzle.

In another further preferred embodiment, the velocities of ferromagnetic or nonferromagnetic shot peening materials can be accurately measured.

The preferred shot peening system and method offer the following advantages: lightweight, easy assembly and repair; good velocity measurement characteristics; increased range of materials which can be measured; good economy; and high strength for safety. In fact, in many of the preferred embodiments, these factors of velocity measurement and increased range of materials are optimized to an extent considerably higher than heretofore achieved in prior known shot peening systems.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION OF THE DRAWINGS

Figure 1:
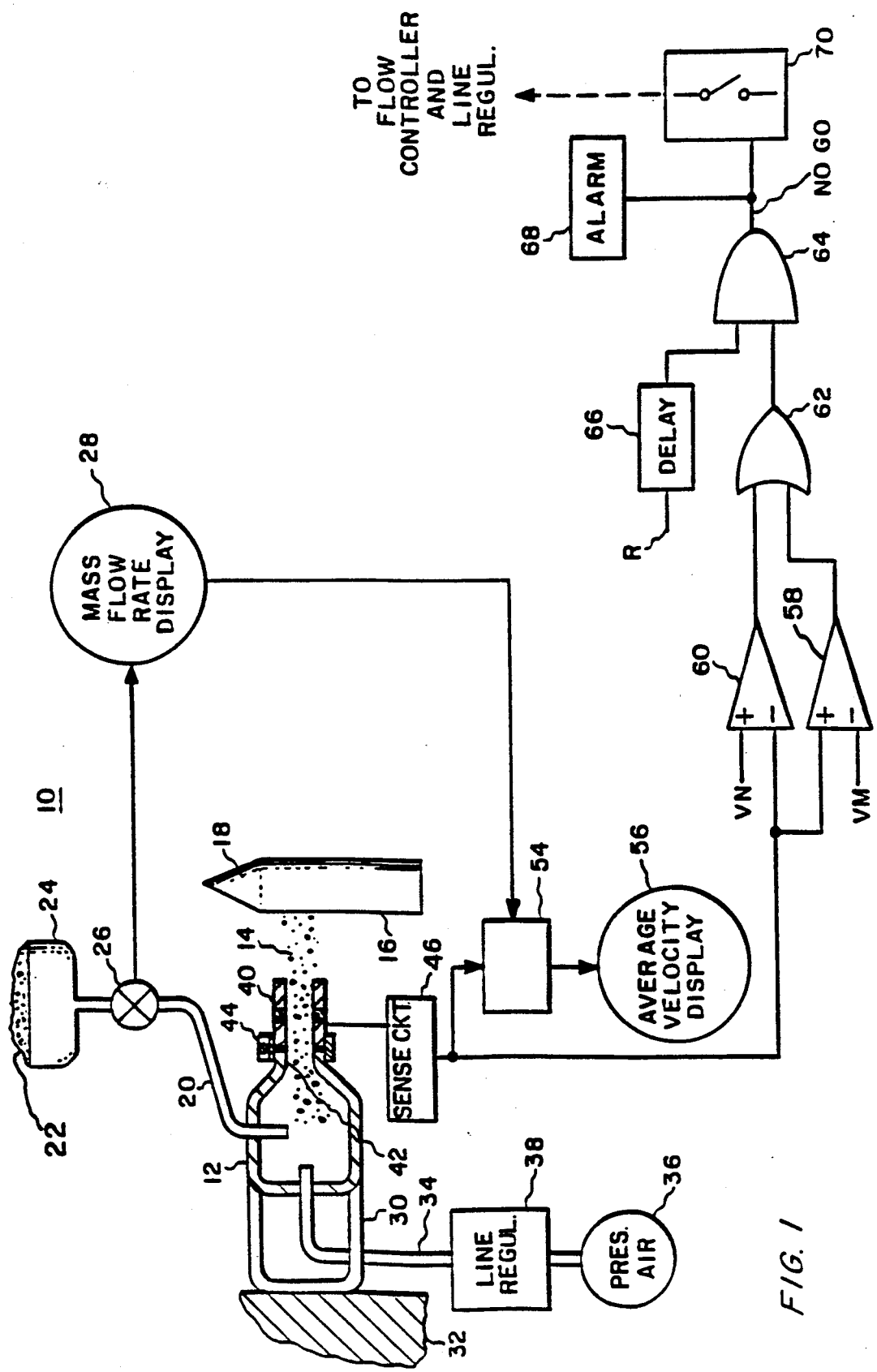
FIG. 1 shows a schematic of the shot peening system of the present invention in conjunction with a side cross section view of a shot peening gun having a first embodiment sensor.

FIG. 1 shows the system 10 according to the present invention. In particular, the system 10 includes a shot peening gun 12 operable to supply shot 14 to a surface 16 of workpiece 18. The shot peening gun 12, which is shown in cross section, is a gravity type shot peening gun, although the present invention may alternatively use other known types of shot peening guns such as a suction lift gun or a pressure pot gun.

The gun 12 is supplied shot by a shot feed line 20 which carries shot 22 from a hopper 24. The shot is supplied to the feed line 20 by way of a flow controller 26. The flow controller 26 may be a common type of flow controller using an electromagnet to dispense metered amounts of ferromagnetic or non-ferromagnetic shot, although other types of flow controllers might be used. The flow controller 26 supplies a mass flow rate signal R as shown. The mass flow rate signal R may be generated by having a capacitance-based densitometer (not separately shown) built into the flow controller 26 in known fashion. More specifically, the mass flow rate signal R may be generated from the capacitance between a set of rings such as used in the Model 160 Electronics Inc. shot flow meter. The rate signal R is supplied to a mass flow rate display 28.

The gun 12 is mounted upon a bracket 30 which, in turn, is attached to support 32. An air feed line 34 supplies pressurized air from pressurized air source 36 by way of line regulator 38.

The discussion which follows will emphasize the additional components of system 10 which are used to generate a signal representative of the average velocity of the shot 14 and which are used to generate a "NO GO" signal upon improper operation of the system.

A sensor 40 is secured adjacent the nozzle outlet 42 of gun 12 by ring clamp 44. The detailed structure of sensor 40 will be discussed in detail below in connection with FIG. 2, but it should be noted here that the sensor 40 includes annular rings (not shown in FIG. 1) which are electrically connected to a sensing circuit 46. The sensor 40 and the sensing circuit 46 together operate as a capacitance based densitometer. More specifically, the sensing circuit 46 internally generates a signal based upon the capacitance field generated by the rings within sensor 40. As the capacitance field within sensor 40 depends upon the amount of ferromagnetic or non-ferrmagnetic shot within the rings, the sensing circuit 46 generates an output m representative of the mass of the shot within the confines of the sensor 40. As the details of the calculations used to generate a mass signal from rings in a capacitance based desitometer are relatively well known, they need not be discussed in detail.

The flow rate signal R (dm/dt) from the mass flow controller 26 (which may incorporate a shot flow meter such as the Electronics, Inc. Model 160) is supplied to a divider 54. The divider 54 generates an output which is the product of flow rate signal R divided by the signal $\rho_n$ representative of the mass within the sensor 40. This output of divider 54 is representative of the average velocity of the shot 14 which is rejected from the gun 12. This average velocity signal is supplied to an average velocity display 56.

Some mathematics may be helpful in explaining why the output of divider 54 does correspond to the average velocity of the shot.

If the shot mass per unit length of nozzle, $\rho_n$, near the exit of a shot peening nozzle is known, the average shot velocity at that location is by the law of continuity simply the shot mass flow rate divided by $\rho_n$, or $$\frac{dm/dt}{\rho S} = V_N \quad (4)$$

The capacitance densitometer sensor 40 is placed in the flow line such that the media velocity is constant. The simplest means of achieving this condition is by a ballistic drop from a hopper or control valve through the sensor. The media velocity through the sensor is governed by the simple gravititional law $$V_s = \sqrt{2gx} \quad (5)$$

where
Vs = the average velocity through the sensor
g = the gravitational acceleration (32.2 ft/sec 2)
x = the distance from the drop point to the center of the sensor If Vs is known, and sensor 40 is used to determine the mass per unit length of media, $\rho S$, in the sensor, the continuity equation (equation 4) can be rearranged, applied to conditions at sensor 40 instead of at the nozzle, and used to determine the media mass flow rate, dm/dt. Namely, $$dm/dt = \rho s V s \quad (6)$$

Sensor 40, when properly calibrated, will measure the media density at the nozzle exit, $\rho N$. Assuming there are no media leaks between the mass flow sensor and the nozzle, the media flow through the nozzle will be the same as that measured by the mass flow monitor.

Thus, according to the continuity law (equation 4), the nozzle velocity will be $$V_N = \frac{dm/dt}{\rho N} \quad (7)$$

The quantity dm/dt can be determined by the capacitance-based densitometer sensor 40. Conversely, if equation 6 is substituted into equation 7, the subsequent law for the nozzle velocity $V_N$ is $$V_N = \rho s V s / \rho N \quad (8)$$

In this case, the velocity can be determined from a ratio of two densitometers, one of which is placed in the flow line where the media velocity is known, the other located at the end of nozzle outlet 42.

In other words, as the mass flow controller 26 has generated the flow rate R, equation 8 can then be used to determined the velocity. Unlike the situation where the shot is passing through mass flow controller 26, the shot 14 ejected from gun 12 does not have a known constant average velocity. Instead, the velocity depends on factors such as upon the air pressure supplied by conduit 34. Given that the rate R is known from the mass flow controller 26, V and $\rho_n$ is calculated by sensing circuit 46 or any other of numerous well known capacitance densitometer arrangements, the divider 54 then calculates the average velocity of the shot 14 leaving the gun 12 by executing equation 8 above.

If the amount shot within sensor 40 is too high or too low, this condition may be indicative of improper operation such as a clog at the nozzle or somewhere else in the shot feed line. Alternatively, it might be indicative of a break in the shot feed line 20. An arrangement for notifying a machine operator of the malfunction will now be discussed.

The signal m is supplied to comparators 58 and 60 which respectively compare the signal with a maximum voltage VM and a minimum voltage VN. If the signal $\rho_n$, which is representative of the mass of shot within the rings of sensor 40 is below the minimum or above the maximum, the corresponding comparator 58 or 60 will go high and, in turn, generate a high level at the output of OR gate 62. The output of gate 62 is supplied to AND gate 64, which gate also receives the mass flow rate signal R by way of delay 66. The delay 66 is simply provided so that, upon start up of the system, the arrangement will not erroneously detect improper operation due to the time lag from turn on of the mass flow controller 26 to the actual ejection of shot 14 from gun 12. Depending on the range of values for R, R could be used directly as an input to delay 66 as shown or could be used to close a semiconductor switch (not shown) which supplies an appropriate level input to delay 66 for registering a high at the upper input of gate 64.

The output of gate 64 is a NO GO signal which is supplied to alarm 68. The sounding of the alarm 68 may notify a machine operator that the shot peening gun is not operating properly. Additionally, the NO GO signal may be provided to a power switch 70 which can be connected to the mass flow controller 26 and the line regulator 38 so as to preferably cut off the power supply to both of those two components. In other words, the opening of switch 70 which can be connected to the mass flow controller 26 and the line regulator 38 so as to, preferably, cut off the power supply to both of those two components On other words, the opening of switch 70 will stop the flow of shot and pressurized air to the gun 12. Thus, upon an improper operating condition corresponding to the mass of shot within the rings of sensor 40 being too high or too low, the alarm 68 will alert the operator and the switch 70 will halt the shot peening operation until corrections or adjustments may be made.

The NO GO circuitry could alternatively or additionally be arranged to generate a NO GO signal upon the velocity signal assuming a value which is so high or so low as to indicate improperly operation.

Figure 2:
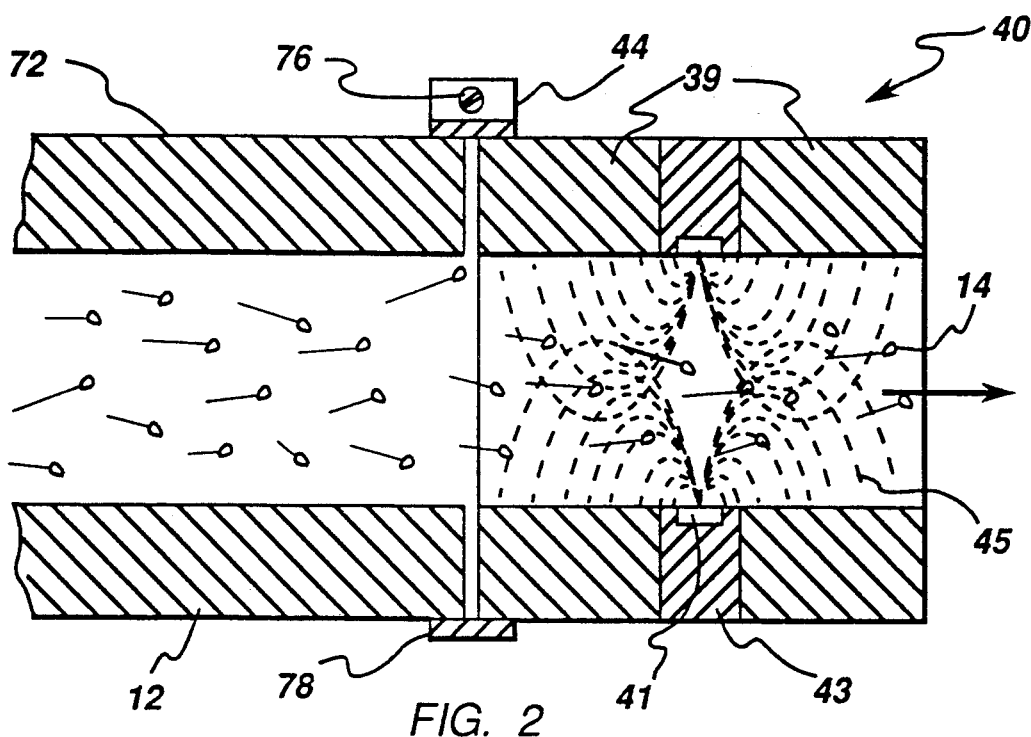
FIG. 2 shows an enlarged side cross section view of the first embodiment sensor according to the present invention.

Turning now to FIG. 2, the details of the structure of sensor 40 will be discussed. The view of FIG. 2 shows a cross section of the sensor 40 at the tip of nozzle 72 of the gun 12. The sensor 40 may be clamped on to the end of the nozzle 72 by a ring clamp 44 having a screw 76 to tighten it. The ring clamp 44 may be of the same general type as a commonly used hose clamp for securing a garden hose to an inside connector. As such, it includes a ring 78 which is tightened by tightening the screw 76. The sensor 40 is cylindrical and of the same outside diameter as the nozzle 72 such that the hose clamp 44 may mate to the outside diameter of nozzle 72 and the outside diameter of sensor 40. The sensor 40 is a continuous-type, capacitance-based sensor and is constructed with a sensing annular ring 41 contained within an insulator 43 that is contained within two secondary rings 39. When sensor 40 is energized by a conventional energizing device, a capacitance field 45 is set up between sensing ring 41 and secondary rings 39. The presence of shot peen 14 in sensor 40 alters the dielectric constant of the air in the capacitance field 45. The altering of the dielectric constant is sensed by circuit 46 (FIG. 1).

The arrangement for the sensor 40 of FIG. 2 makes the present system 10 applicable to a preexisting shot peening gun 12 (only partially shown in FIG. 2). The sensor 40 may easily be clamped by the hose clamp 44 to the end of a preexisting shot peening gun 12. Alternatively, a bracket (not shown) or series of brackets (not shown) could be used to mount the sensor 40 to the tip of nozzle end of the gun 12.

Figure 3:
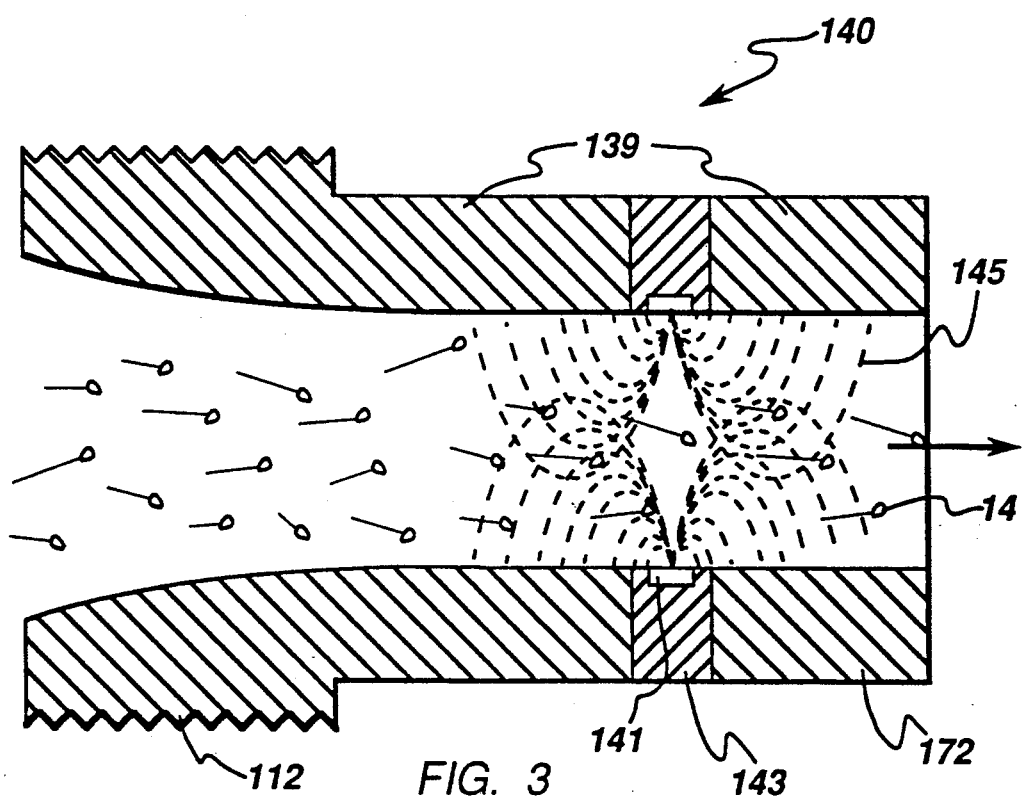
FIG. 3 shows a side cross section view of a second embodiment sensor according to the present invention.

FIG. 3 shows an alternate arrangement in which a sensor 140 is built into the shot peening gun 112. It will be noted that the components of the embodiment of FIG. 3 have the same last two digits as the corresponding component, if any, of the embodiment or arrangement of FIG. 2. The sensor 140 is built into the gun 112 adjacent the nozzle 172. Specifically, the nozzle 172 has a sensing annular ring 141 contained within an insulator 143 that is contained within two secondary rings 139. When sensor 140 is energized by a conventional engaging device, a capacitance field 145 is set up between sensing ring 41 and secondary rings 39. The presence of shot 14 in sensor 140 alters the dielectric constant of the air in the capacitance field 145. The altering of the dielectric constant is sensed by circuit 46 (FIG. 1).

An alternate arrangement broadly contemplated by the present invention would use a nozzle sensor such as 40 of FIGS. 1 and 2 or 140 of FIG. 3 to provide capacitance-based densitometer information in combination with a reaction force sensor. Such a reaction force sensor (not shown) would be disposed between the bracket 30 and support 32 in the manner shown and described in U.S. Pat. No. 4,805,429 ('429) to Thompson entitled "SHOT PEENING SYSTEM AND METHOD WITH VELOCITY SENSING", assigned to the same assignee of the present invention. The contemplated alternative to the arrangement of FIG. 1 would include a sensor such as 40 adjacent the nozzle of the gun and the reaction force sensor such as disclosed in the '429 patent. The alternative would not require the generation of the rate signal R from the mass flow controller such as 26 of FIG. 1. Instead, the force sensor would be used to sense the force due to the expulsion of shot from the gun 12 by way of the technique described in the '429 patent.

The shot force F satisfies the equation:

$$v = F/R \qquad (9)$$

Recalling equation 6 above and since this alternate embodiment does not use the mass flow controller 26 to provide the rate signal R for the equation, equations 6 and 9 are two (2) independent equations having the two (2) unknowns of the average shot velocity v and the flow rate R. Equating the right said of equations 8 and 5 and solving for R indicates that the unknown flow rate may be calculated as follows;

$$R = (\rho_s F)^{\frac{1}{2}} \qquad (10)$$

The equations then may be solved for v as follows:

$$V_s = (F/\rho_s)^{\frac{1}{2}} \qquad (11)$$

By using a capacitance-based densitometer arrangement at the nozzle of the gun in combination with a reaction force sensor as in this alternate embodiment, very accurate results may be obtained. It will be appreciated that this alternate arrangement would provide the force signal in similar fashion to that described in the '429 patent and the signal $\rho_n$ corresponding to the mass of shot within sensor 40 adjacent the nozzle would be provided. Those two (2) signals, together $\rho_s$, would simply be used by a calculation circuit to generate the values of the mass flow rate R and the velocity signal v.

Obvious implementation requirements may cause one to include a manifold between the air supply hose and the gun itself and/or a manifold between the shot supply hose and the gun itself in order to prevent extraneous hose forces from entering the gun when the gun is moved.

While the preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A shot peening system comprising:
    a gun for shot peening, said gun having a nozzle with an outlet;
    a first sensor adjacent said nozzle outlet, said first sensor including first and second rings such that a capacitance field is created between said first and second rings which varies according to the amount of shot passing through said nozzle outlet;
    a first sensing circuit means connected to said first end and second rings for sensing a capacitance field between said rings and generating an amount signal representative of said amount of shot passing through said nozzle outlet;
    a second sensor located substantially upstream of said first sensor responsive to the amount of shot supplied to said gun wherein said second sensor comprises a mass flow sensor for generating said time-dependent signal as a function of mass flow rate;
    a second sensing circuit means connected to said second sensor for generating a time-dependent signal corresponding to the amount of shot supplied to said gun during a unit period of time; and
    calculation means for receiving as inputs said amount signal and said time-dependent signal and generating therefrom a velocity signal representative of the average velocity signal representative of the average velocity of shot leaving the gun wherein said calculation means generates the velocity signal by calculating:

$$V_n = \rho_s V_s / \rho_n$$

where $V_n$ = velocity of the shot at the nozzle, $\rho_s$ = shot mass per unit length in the sensor, $V_s$ = average velocity of the shot through the sensor, and $\rho_n$ = shot mass per unit length in the nozzle.

2. The system, according to claim 1, wherein said first sensor is further comprised of:
    a sensing ring means;
    a insulator means located adjacent said sensing ring means; and
    a secondary ring means located adjacent said insulator means.

3. The system, according to claim 1, wherein said first sensor is further comprised of:
    a continuous sensor.

4. The system, according to claim 1, wherein said first sensor is responsive to ferromagnetic shot.

5. The system, according to claim 1, wherein said first sensor is responsive to non-ferromagnetic shot.

6. The system, according to claim 1, further comprises means for generating a NO GO signal when said first sensing circuit means detects a condition indicative of improper operation of said gun.

7. The system, according to claim 6, further comprising an alarm which sounds in response to said NO GO signal.

8. The system, according to claim 6, further comprising means for halting shot peening upon occurrence of a NO GO signal.

9. A method of shot peening comprising the steps of:
supplying shot to a gun;
generating a time-dependent signal as a function of the amount of shot supplied to said gun during a unit period of time wherein said time-dependent signal is provided by generating a flow rate signal dependent on the flow of shot to said gun;
operating said gun to expel shot from the nozzle outlet of said gun;
sensing the amount of shot within a volume by a capacitance-based densitometer located adjacent said nozzle outlet;
generating an amount signal based on said sensed amount of shot;
supplying said amount signal and said time-dependent signal to a calculation means; and
generating, by operation of said calculation means, a velocity signal representative of the average velocity signal representative of the average velocity of shot leaving the gun through said nozzle outlet wherein the generation of said velocity signal includes the calculation:

$$Vn = \rho_s Vs/\rho_n$$

where $Vn$ = velocity of the shot at the nozzle, $\rho_s$ = shot mass per unit length in the sensor, $Vs$ = average velocity of the shot through the sensor, and $\rho_n$ = shot mass per unit length in the nozzle.

10. The method of claim 9, wherein said shot is ferromagnetic.

11. The method of claim 9, wherein said shot is non-ferromagnetic.

* * * * *